(12) United States Patent
Yatagai et al.

(10) Patent No.: US 8,074,971 B2
(45) Date of Patent: Dec. 13, 2011

(54) AUXILIARY COOLING APPARATUS

(75) Inventors: Hiroomi Yatagai, Tokyo (JP); Syunichi Nagashima, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 432 days.

(21) Appl. No.: 12/457,307

(22) Filed: Jun. 8, 2009

(65) Prior Publication Data
US 2009/0321967 A1 Dec. 31, 2009

(30) Foreign Application Priority Data

Jun. 25, 2008 (JP) ................................. 2008-166408

(51) Int. Cl.
*B01F 3/04* (2006.01)

(52) U.S. Cl. ....................................... 261/106; 261/107

(58) Field of Classification Search .................... 261/97, 261/103, 104, 106, 107
See application file for complete search history.

(56) References Cited

U.S. PATENT DOCUMENTS

| 796,557 A | * | 8/1905 | Bockoven | 261/107 |
| 1,841,536 A | * | 1/1932 | Jordahl | 261/97 |
| 4,211,807 A | * | 7/1980 | Yazawa et al. | 428/109 |
| 5,168,832 A | * | 12/1992 | Price | 119/310 |
| 7,044,993 B1 | * | 5/2006 | Bolduc | 55/524 |

FOREIGN PATENT DOCUMENTS

DE 296 01 847 U1 * 4/1997

* cited by examiner

*Primary Examiner* — Charles Bushey
(74) *Attorney, Agent, or Firm* — Bacon & Thomas, PLLC

(57) ABSTRACT

For fire prevention, an auxiliary cooling apparatus applied to an outdoor condenser of a refrigerating cycle is provided with a filter which has air permeability and is arranged to oppose to an ambient air intake port of the condenser, and cools ambient air by heat exchange between the ambient air sucked into the ambient air intake port through the filter and water supplied to the filter, lots of implanted fibers (17), which are fine projections, are implanted on surfaces of fibers (15), which constitute a base material of the filter, via a self-extinguishing adhesive agent layer (16), so that an adhesive layer (16), and the fiber (15) of the base material do not burn even if the implanted fibers (17) are ignited, whereby an auxiliary cooling apparatus which is excellent in the light of safety can be provided.

12 Claims, 4 Drawing Sheets

CROSS SECTIONAL VIEW ALONG A-A'

ENLARGED VIEW OF B

US 8,074,971 B2

AUXILIARY COOLING APPARATUS

BACKGROUND OF THE INVENTION

1. Field of the Invention

This invention relates to an auxiliary cooling apparatus which is structured such that a filter having air permeability is arranged so as to oppose to an ambient air intake port of a condenser of a refrigerating cycle, and the ambient air is cooled by heat exchange between the ambient air sucked into the ambient air intake port through the filter and a water content supplied to the filter.

2. Description of the Conventional Art

It is necessary to cool the condenser used in the refrigerating cycle of air conditioning, freezing and refrigerating apparatuses and the like, for liquefaction of a refrigerant. An air cooled type apparatus in which the condenser is cooled by air is inexpensive because an apparatus structure is simple, however, has a problem that a cooling efficiency of a store room or a living room is lowered at a high temperature time in summer. In order to solve the problem mentioned above, it has been variously proposed to use an auxiliary cooling apparatus in addition to an air cooled type outdoor machine (a condenser).

As one example of the auxiliary cooling apparatus, the applicant of the present invention has already proposed a structure in which a mat having a filter with air permeability is arranged so as to oppose to a heat radiating portion of the condenser, and the air sucked into the heat radiating portion is cooled by cooling water which flows downward from an upper portion of the mat to a lower portion thereof (refer to Japanese Unexamined Patent Publication No. 2004-3806).

SUMMARY OF THE INVENTION

Problem to be Solved by the Invention

As the filter of the mat for the auxiliary cooling apparatus, there has been used, for example, a filter constructed by piling up resin fibers like an unwoven fabric so as to prevent ventilating resistance from being increased. Further, in order to improve a water holding property of the filter, there has been proposed a structure in which a lot of fine projections are implanted on a surface of a base material of the filter via an adhesive agent.

In the meantime, taking into consideration such a condition that the mat for the auxiliary cooling apparatus is attached to an outdoor machine which is generally installed in the open air, attention must be paid to a safety side so that flames do not spread even if the filter is ignited.

An object of this invention is to provide an auxiliary cooling apparatus structured such that a lot of fine projections are implanted on a surface of a base material of a filter via an adhesive agent, and improvement of safety is achieved by the filter being made hard to be burnt.

Means for Solving the Problem

In order to solve the problem mentioned above, in accordance with this invention, there is provided an auxiliary cooling apparatus structured such that a filter having air permeability is arranged so as to oppose to an ambient air intake port of a condenser of a refrigerating cycle, and ambient air is cooled by heat exchange between the ambient air sucked into the ambient air intake port through the filter and water supplied to the filter, wherein a lot of fine projections are implanted on a surface of a base material of the filter via a self-extinguishing adhesive agent.

Effect of the Invention

In accordance with the auxiliary cooling apparatus, since the adhesive agent for implanting of a lot of fine projections on the front surface of the base material of the filter is provided with a self-extinguishing property, flames do not spread to the adhesive agent even if the fine projections implanted on the filter are ignited, and the whole of the filter does not burn.

DETAILED DESCRIPTION OF PREFERRED EMBODIMENT

Figure 1:
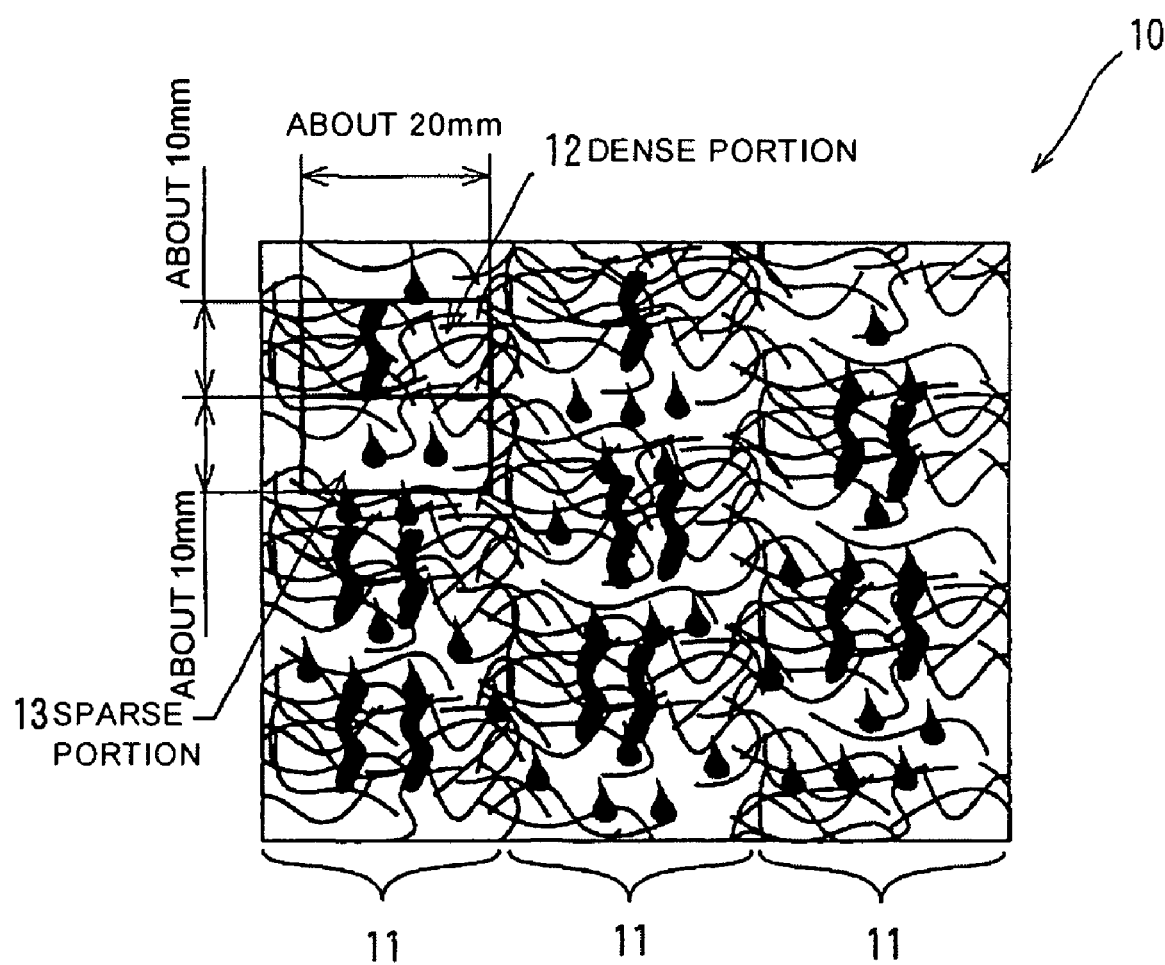
FIG. 1 is a front schematic view showing a part of a front surface of a filter which constitutes a cooling mat used in an auxiliary cooling apparatus in accordance with this invention.

A description will be given below of an embodiment of an auxiliary cooling apparatus in accordance with this invention on the basis of the accompanying drawings. FIG. 1 is a front schematic view showing a part of a front surface of a filter which constitutes a cooling mat used in an auxiliary cooling apparatus in accordance with this invention.

The cooling mat 10 shown in FIG. 1 is structured as a filter in an unwoven fabric state by entwining of fibers, and is constructed by a plurality of vertical lines 11 in a large sense, and dense portions 12 and sparse portions 13 are arranged side by side alternately in a vertical direction in each of the lines 11. Each of the dense portions 12 and the sparse portions 13 has such a rectangular spread that a vertical dimension is about 10 mm, and a horizontal dimension is about 20 mm. The adjacent vertical lines 11 are arranged so as to be connected, however, are slightly (about 5 mm) shifted in a vertical direction so as to prevent the dense portions 12 from being adjacent to each other. A specific gravity of the present cooling mat 10 is about 0.025 g/cm$^3$. Points and thick lines shown in black schematically indicate flows and a dropping state of the cooling water.

Since the cooling mat 10 shown in FIG. 1 is formed so as to be divided into the sparse portions and the dense portions, a pressure loss of the whole of the air which passes through the mat 10 becomes lowered in comparison with the other structures than this. In this example, the pressure loss is lowered to about 4 Pa at a wind speed 1.5 m/sec. Suction resistance of the cooling air is lowered at that degree, and an increase of a suction air amount can be expected.

Figure 2A:
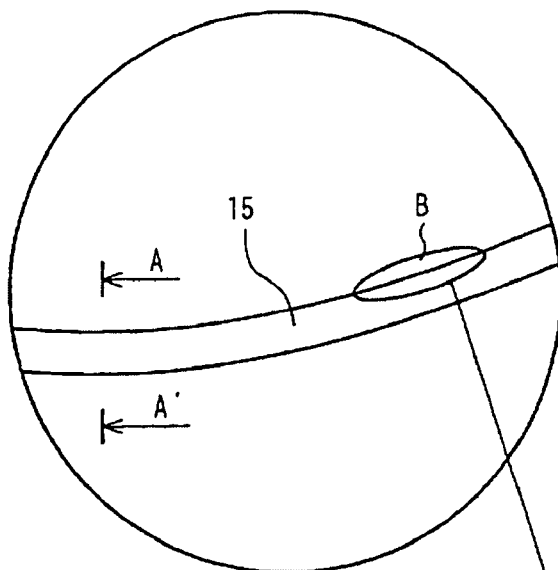
FIGS. 2(a) to (c) are schematic views showing a part of a fiber which constitutes the cooling mat shown in FIG. 1 in an enlarged manner.
Figure 2B:
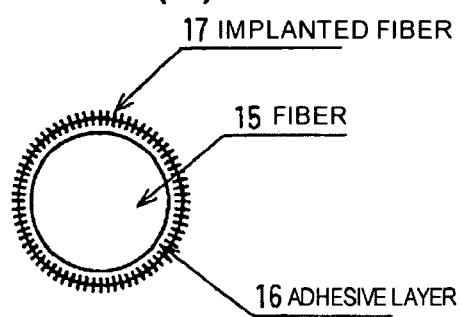
Figure 2C:
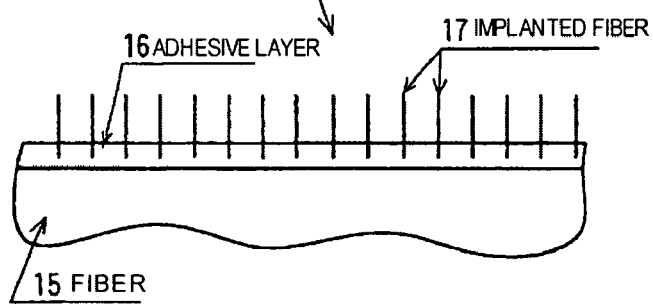

FIGS. 2(a) to (c) are schematic views showing a part of a fiber which constitutes the cooling mat shown in FIG. 1, in which FIG. 2(a) is a view showing one piece of fiber, FIG.

2(b) is a cross sectional view along a line A-A' showing the fiber shown in FIG. 2(a) in a further enlarged manner, and FIG. 2(c) is a view showing a portion B of the fiber shown in FIG. 2(a) in a further enlarged manner.

Each of fibers 15 extends long and has a uniform cross section, and polyvinyl chloride (PVC) is employed as a base material thereof. The fiber 15 has a circular cross section as shown in FIG. 2(b), and an adhesive layer 16 constituted of a self-extinguishing adhesive agent is formed on a surface thereof by dipping, coating, spraying or the like. A lot of piles, that is, implanted fibers 17, are implanted, as projections to be implanted on a surface of the base material, on a front face of the fiber 15 on which the adhesive layer 16 is formed. For example, a polychlarl (synthetic fiber constituted by 50% vinylon and 50% PVC; name of product: Cauderan) can be employed as the implanted fiber 17, a diameter $\phi$ of this fiber being, for example, about 0.013 mm, and a length thereof being about 0.5 mm.

The implanted fibers 17 can be implanted onto the surface of the fiber 15 in accordance with an electrostatic implanting method. An infinitude of implanted fibers 17 discharged into an electrostatic field stick onto the adhesive layer 16 like as needles in a state of orderly alignment vertically to the surface of the fiber 15, on the basis of an electrostatic attraction effect in the electric field, when the fiber 15 provided with the adhesive layer 16 is passed through the electrostatic field. The implanted fibers 17 are firmly fixed to the surface of the fiber 15 by drying of the adhesive layer 16. The adhesive agent, which constitutes the adhesive layer 16, is provided with the self-extinguishing property, details of which will be mentioned below. Accordingly, there appears such a state that downy hairs grow uniformly on the surface of the fiber 15, and fine particles of cooling water are held between the implanted fibers 17 or over several implanted fibers 17, when the cooling water is supplied to the cooling mat 10 by a water spray or the like.

Figure 3:
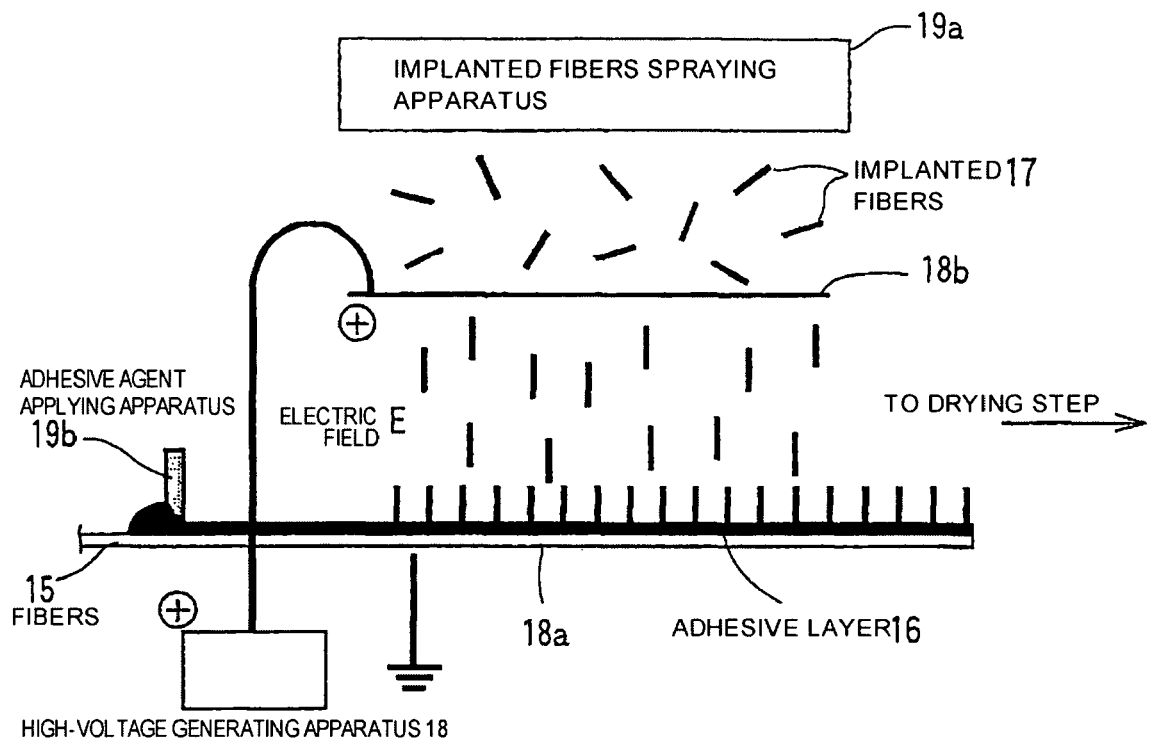
FIG. 3 is a schematic view showing an example of an electrostatic implanting apparatus.

The cooling mat 10 is manufactured by using an intermediate raw material obtained by forming the fibers 15 into a flat and long band-shaped unwoven fabric state, for example, having a width about 2 mm and a length about 10 m. The intermediate raw material mentioned above is handled, for example, in a state of being wound into a roll shape in a longitudinal direction. An existing apparatus can be utilized as an electrostatic implanting apparatus for applying an electrostatic implanting to the intermediate raw material. Accordingly, it is possible to make a cost necessary for a production equipment inexpensive. FIG. 3 is a schematic view showing an example of the electrostatic implanting apparatus. In the present embodiment, a direct-current high voltage is applied between electrodes 18a and 18b by a high voltage generating apparatus 18 shown in FIG. 3, and an infinitude of implanted fibers 17 are dispersed to an electric field E between the electrodes 18a and 18b from an implanted fiber dispersing apparatus 19a. The implanted fibers 17 are aligned in parallel on the basis of electrostatic attraction force along the electric field according to Coulomb force, and stick to the adhesive layer 16 on the surface of the fiber 15 which is previously applied by an adhesive agent applying apparatus 19b. In the manufacturing method mentioned above, since it is possible to extremely easily implant an infinitude of the implanted fibers 17 onto the surface of the fiber 15 in a state of orderly alignment, a productivity is very high.

The fine particles of the cooling water are extremely readily held on the surface of the fiber 15 as a result of a lot of implanted fibers 15 being implanted on the surface of the fiber 15. The water in the fine particles state are readily evaporated, and an amount of specific latent heat absorbed from the air which passes through the cooling mat 10 is dramatically improved. Accordingly, it is possible to sufficiently cool the passing air so as to effectively cool the condenser of the refrigerating system. Further, it is possible to attach the implanted fibers 17 only to the fiber 15 within a region in which the adhesive layer 16 is formed, when the intermediate raw material passes through the electrostatic field, by masking to the intermediate raw material so as to partly form the adhesive layer 16 on the intermediate raw material. As mentioned above, it is possible to reduce use amounts of the implanted fibers 17 and the adhesive agent by applying the electrostatic implanting only to the necessary portion of the cooling mat 10.

Figure 4:
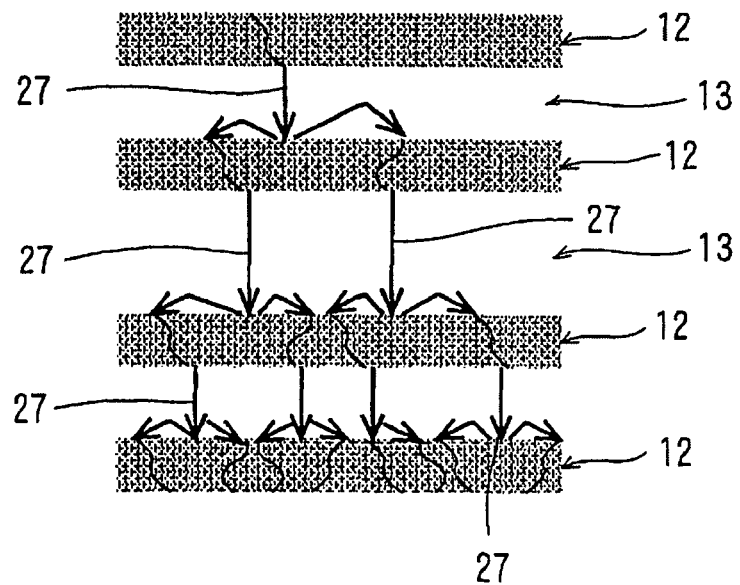
FIG. 4 is a schematic view showing an example of a flow of cooling water in the cooling mat used in the auxiliary cooling apparatus in accordance with this invention.

FIG. 4 is a schematic view showing an example of a flow of the cooling water in the cooling mat used in the auxiliary cooling apparatus in accordance with this invention.

Cooling water 27 sprayed to an upper end portion of the cooling mat 10 flows meanderingly at a time of flowing through the dense portion 12, and forms into water droplets so as to free fall at a time of reaching the sparse portion 13, as shown in FIG. 4. The cooling water 27, which drops from the sparse portion 13 to reach the dense portion 12 below the same, spreads laterally by colliding with the fibers of the dense portion 12 or staying there, and the spread water combines with other spread water to flow meanderingly in the dense portion 12. The cooling water 27 which flows down to a lower end portion without evaporating in the process, is discharged from the lower end portion. The cooling water 27 repeats the process mentioned above, which includes the meandering in the dense portion 12, the free falling in the sparse portion 13, and the colliding and spreading at a time of reaching the next dense portion 12, every time it flows down through the dense portions 12 and the sparse portions 13.

The cooling water flowing down from the upper end portion of the cooling mat 10 is held in a state of the fine particles by the implanted fibers in the region in which the implanted fibers are provided, during flowing down through the dense portions 12 or the sparse portions 13. As a result, the evaporation of the cooling water 27 is promoted in the region, and it is possible to efficiently cool the air which passes there.

Figure 5:
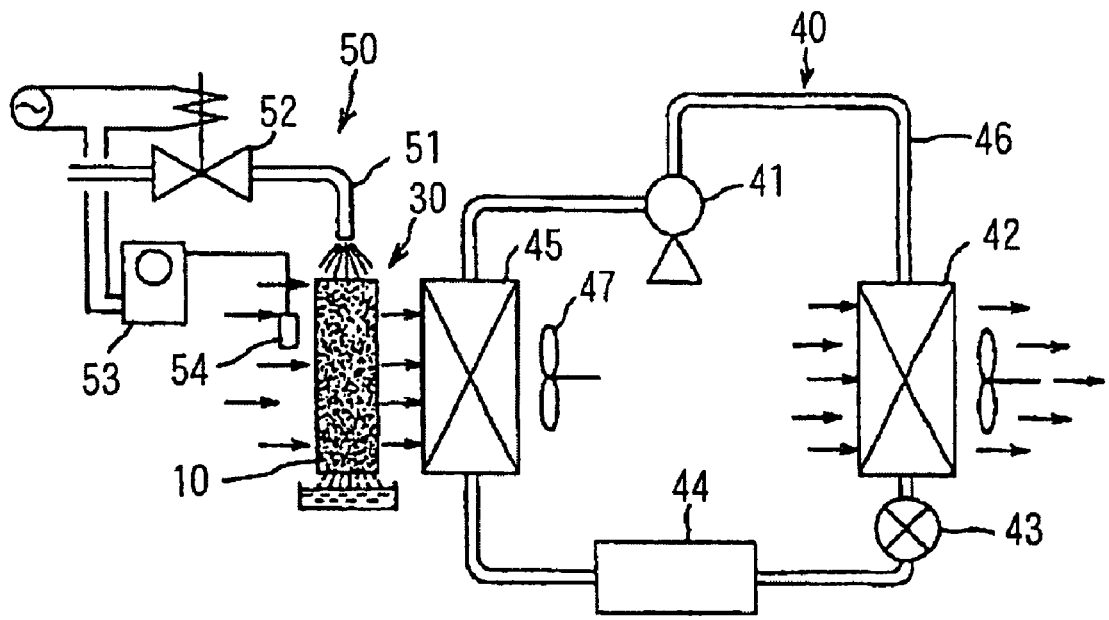
FIG. 5 is a schematic view showing an example of a refrigerating cycle to which the auxiliary cooling apparatus in accordance with the present invention is applied.

FIG. 5 shows an outline of an example of a refrigerating cycle to which the auxiliary cooling apparatus in accordance with this invention is applied. A refrigerating cycle 40 is provided with a compressor 41, an evaporator 42, an expansion valve 43, a dryer 44, a condenser 45 and a refrigerant pipe 46 for coupling them. A water supply apparatus 50 is provided, for example, with a water supply pipe 51 communicating with a city water pipe, an electromagnetic valve 52 interposed to the water supply pipe 51 to function as an opening and closing valve for cutting off or passing city water, a thermostat 53 for controlling the opening and closing of the electromagnetic valve 52, and a sensor 54 for measuring a temperature of inflow air to the mat 10 of the auxiliary cooling apparatus 30. Since latent heat of the air sucked into the condenser 45 by a fan 47 is absorbed on the basis of evaporation of the cooling water flowing down in the mat 10, when the air passes through the mat 10 of the auxiliary cooling apparatus 30, the air is cooled.

In accordance with this structure, when the sensor 54 senses the fact that the temperature of the intake air becomes a set value or more or becomes the set value or less, the thermostat 53 works so as to open or close the electromagnetic valve 52. When the electromagnetic valve 52 comes to an open state, the city water is supplied to the mat 10 of the auxiliary cooling apparatus 30 from the water supply pipe 51 via a sprinkler nozzle (not shown), and cools the condenser 45 in accordance with the manner mentioned above. Due to an indirect cooling system to cool the air for cooling a radiating fin of the condenser 45, corrosion and attachment of scale are not caused as is different from the case of directly watering on the radiating fin. Further, since the auxiliary cooling apparatus 30 can be added to the conventional condenser by later attachment, it can be attached without large modification of the existing equipment, and attachment and exchange for maintenance or the like are easily done.

Figure 6:
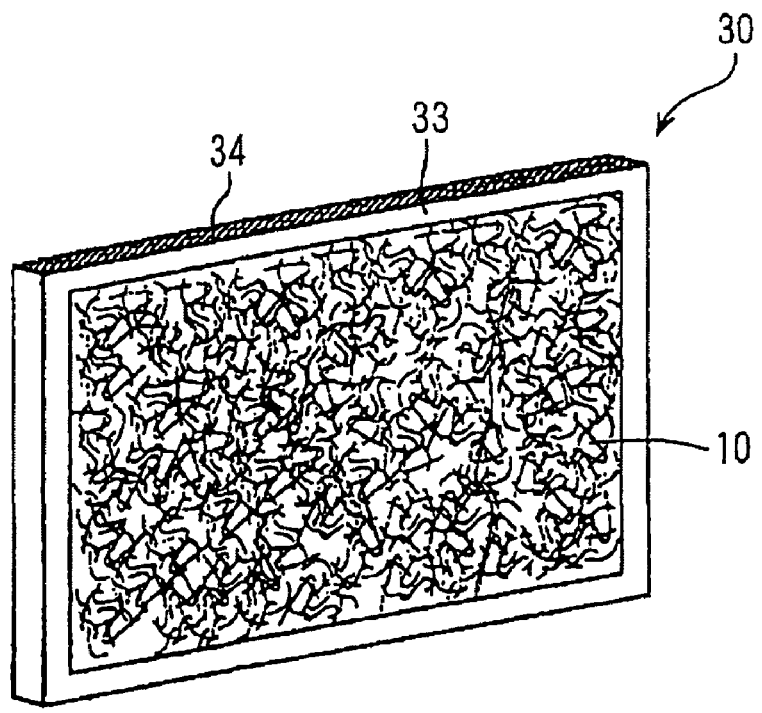
FIG. 6 is a schematic view showing the whole of the cooling mat used in the auxiliary cooling apparatus in accordance with the present invention.

FIG. 6 is a perspective view showing the whole of the cooling mat used in the auxiliary cooling apparatus 30 in accordance with the present invention. The cooling mat 10 is attached in a state of being surrounded by a proper frame 33 at its periphery. An upper end 34 of the frame is a porous frame, and the sprayed cooling water forms approximately straight water lines to flow down, although they accompanies somewhat meandering.

The cooling water, which is held in the fine particles state by the implanted fine projections on the fibers of the cooling mat 10, is readily evaporated by the passing air, and absorbs heat of evaporation from the passing air so as to effectively cool the passing air, as mentioned above. A net (not shown) may be provided over a back surface of the cooling mat 10 so as to prevent the cooling mat 10 from bending backward by the intake air, and prevent the cooling water dropping down in the cooling mat 10 from flying toward the back side together with the intake air.

In the present embodiment, the description is given of the cooling mat for auxiliary cooling by exemplifying the cooling mat in which the sparse portions and the dense portions are arranged dividedly, however, the mat for the auxiliary cooling apparatus in accordance with the present invention is not limited to the structure mentioned above, but may be constructed by a fiber structure having a uniform dense. Further, even in the case that the cooling mat is provided with both the sparse and dense portions of the fibers, the embodiment mentioned above is rather typically patterned, however, it is possible to modify to an appropriate type without being limited to the patterned. Further, the projections such as the implanted fibers or the like are not necessarily provided to the whole of the fibers constituting the cooling mat but may be provided only to a part thereof, for example, in correspondence to a location, a shape and the like of the heat radiating portion of the condenser, regardless of whether or not both of the sparse and dense portions of the fibers are provided in the cooling mat.

In this case, for example, the cooling mat (the filter) is structured with a combination ratio in the following range. Weight per unit area is 650 g/m²±15% for the base material, 500 g/m²±25% for the adhesive agent, and 250 g/m²±25% for the projection.

The base material of the cooling mat may be constituted of a (fire retardant) material having a self-extinguishing property or (combustible) material having no self-extinguishing property, however, the material having the self-extinguishing property is preferable in the light of safety. For example, a poly vinyl chloride (PVC) and poly vinylidene chloride (PVDC) can be indicated as the material having the self-extinguishing property. Further, for example, a polypropylene (PP) and a polyethylene terephthalate (PET) can be indicated as the non-self-extinguishing material. In this case, the self-extinguishing property means a property that a flame disappears by itself when a source of fire is moved away, after being initially ignited by the source of fire.

In the embodiment mentioned above, while the implanted fibers 17, which are the projections, are constituted of the polychlarl (name of product; Cauderan), the polychlarl is the synthetic fiber constituted of 50% vinylon and 50% PVC, and has a self-extinguishing (fire retardance) property. However, the implanted fibers (piles), which are the projections, may be generally made of not only the self-extinguishing material, but also the non-self-extinguishing material. As an example of the implanted fiber material having the non-self-extinguishing property, regenerated cellulose (rayon) and nylon 6 (nylon) can be indicated. Further, as the implanted fibers, it is preferable to employ rayon piles. The rayon pile has a high hydrophilic nature, and the function of holding the flowing down cooling water is hard to be deteriorated, even after repeated uses.

In the embodiment mentioned above, the adhesive agent used for the adhesive layer 16 for implanting of the implanted fibers 17, which are the projections, on the surface of the base material 15 is that having the self-extinguishing property. The self-extinguishing adhesive agent may be made by adding a fire retardant additive to an appropriate non-self-extinguishing adhesive agent of an acrylic type, an urethane type, an epoxy type, a vinyl acetate type or the like. The fire retardant additive includes an organic fire retardant additive and an inorganic fire retardant additive. A bromine compound, a phosphorus compound and chloride compound can be indicated as the organic fire retardant additive, and an antimony compound and a metallic oxide can be indicated as the inorganic fire retardant additive. It is preferable that the self-extinguishing adhesive agent contains include 15 weight % or more fire retardant additive, for achieving the necessary self-extinguishing function.

In the auxiliary cooling apparatus, if the adhesive agent used in the cooling mat burns, the base material burns even in the case that the base material is formed by the fire retardant material. In other words, if the adhesive agent is not the self-extinguishing type, the adhesive agent keeps burning in the case that the adhesive agent is ignited, with the result that the cooling mat burns regardless of whether or not the base material and the material of the projections are provided with the self-extinguishing property. In the present invention, since the adhesive agent for implanting of the projections to the base material is made of the self-extinguishing material, it is very preferable in the light of safety, in consideration of the condition that the cooling mat for the auxiliary cooling is attached to the outdoor machine which is generally installed in the open air.

What is claimed is:

1. An auxiliary cooling apparatus structured such that a filter having air permeability is arranged so as to oppose to an ambient air intake port of a condenser of a refrigerating cycle, and ambient air is cooled by heat exchange between said ambient air sucked into said ambient air intake port through said filter and water supplied to said filter, wherein a lot of fine projections are implanted on a surface of a base material of said filter via a self-extinguishing adhesive agent.

2. An auxiliary cooling apparatus as claimed in claim 1, wherein said adhesive agent includes 15 weight % or more fire retardant additive.

3. An auxiliary cooling apparatus as claimed in claim 1, wherein said base material is made of a self-extinguishing material.

4. An auxiliary cooling apparatus as claimed in claim 2, wherein said base material is made of a self-extinguishing material.

5. An auxiliary cooling apparatus as claimed in claim 1, wherein said projections are constituted of implanted fibers implanted in accordance with an electrostatic implanting.

6. An auxiliary cooling apparatus as claimed in claim 2, wherein said projections are constituted of implanted fibers implanted in accordance with an electrostatic implanting.

7. An auxiliary cooling apparatus as claimed in claim 3, wherein said projections are constituted of implanted fibers implanted in accordance with an electrostatic implanting.

8. An auxiliary cooling apparatus as claimed in claim 4, wherein said projections are constituted of implanted fibers implanted in accordance with an electrostatic implanting.

9. An auxiliary cooling apparatus as claimed in claim 5, wherein said implanted fibers are made of rayon piles.

10. An auxiliary cooling apparatus as claimed in claim 6, wherein said implanted fibers are made of rayon piles.

11. An auxiliary cooling apparatus as claimed in claim 7, wherein said implanted fibers are made of rayon piles.

12. An auxiliary cooling apparatus as claimed in claim 8, wherein said implanted fibers are made of rayon piles.

* * * * *